US012752590B2

(12) United States Patent
Yoshimatsu et al.

(10) Patent No.: US 12,752,590 B2
(45) Date of Patent: Oct. 6, 2026

(54) ELECTRIC VEHICLE AIR CONDITIONING SYSTEM

(71) Applicant: TOYOTA JIDOSHA KABUSHIKI KAISHA, Toyota (JP)

(72) Inventors: Junichi Yoshimatsu, Nagoya (JP); Naohiro Saito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 85 days.

(21) Appl. No.: 18/533,173

(22) Filed: Dec. 8, 2023

(65) Prior Publication Data

US 2024/0253418 A1 Aug. 1, 2024

(30) Foreign Application Priority Data

Jan. 30, 2023 (JP) ................................ 2023-012291

(51) Int. Cl.
*B60H 3/00* (2006.01)
*B60H 1/00* (2006.01)

(52) U.S. Cl.
CPC .................... *B60H 1/00392* (2013.01); *B60H 2001/00092* (2013.01); *B60H 2001/00107* (2013.01)

(58) Field of Classification Search
CPC ...... B60H 1/00392; B60H 2001/00092; B60H 2001/00107
USPC ........................................................... 165/43
See application file for complete search history.

(56) References Cited

U.S. PATENT DOCUMENTS

| | | | |
|---|---|---|---|
| 2013/0316634 | A1 | 11/2013 | Ajisaka |
| 2021/0061065 | A1 | 3/2021 | Oshikiri et al. |
| 2022/0024277 | A1 | 1/2022 | Shimauchi |

FOREIGN PATENT DOCUMENTS

| | | | | | |
|---|---|---|---|---|---|
| CN | 109968942 | A | * | 7/2019 | |
| EP | 3578396 | A1 | | 12/2019 | |
| JP | H06-024238 | A | | 2/1994 | |
| JP | H0624238 | A | * | 2/1994 | |
| JP | H08535 | B2 | * | 1/1996 | |
| JP | H08-040088 | A | | 2/1996 | |
| JP | H0840088 | A | * | 2/1996 | ......... B60H 1/00278 |
| JP | 5447733 | B2 | | 3/2014 | |
| JP | 2018-122783 | A | | 8/2018 | |
| JP | 2021-037807 | A | | 3/2021 | |
| JP | 2022-023445 | A | | 2/2022 | |

OTHER PUBLICATIONS

_JP_H0624238_A translation.*
JP_H0840088_A translation.*

* cited by examiner

*Primary Examiner* — Elizabeth J Martin
(74) *Attorney, Agent, or Firm* — SOLARIS Intellectual Property Group, PLLC

(57) ABSTRACT

An electric vehicle air conditioning system includes: an outside air introduction portion that communicates an inside of a case configuring an outer shell of an air conditioning device with an outside of a vehicle; an air circulating portion that is disposed at the inside of the case, and that circulates air from an air circulating port provided at the case to an interior of a vehicle cabin, by being driven; and an air flow direction changing portion that is provided at the case, and that is moveable to direct a portion of air circulated from the air circulating portion to a heat generating device that is disposed at an inside of a power unit room.

3 Claims, 4 Drawing Sheets

ELECTRIC VEHICLE AIR CONDITIONING SYSTEM

CROSS-REFERENCE TO RELATED APPLICATION

This application is based on and claims priority under 35 USC 119 from Japanese Patent Application No. 2023-012291, filed on Jan. 30, 2023, the disclosure of which is incorporated by reference herein.

BACKGROUND

Technical Field

The present disclosure relates to an electric vehicle air conditioning system.

Related Art

Japanese Patent Application Laid-Open (JP-A) No. 2021-37807 discloses technology relating to a vehicle air conditioning device.

In this vehicle air conditioning device, the internal air introduction rate can be reduced in a case in which the air is circulated in the outside air introduction mode by the air conditioning device inside the vehicle cabin. Accordingly, in the prior art Japanese Patent Application Laid-Open (JP-A) No. 2021-37807, the warm air that is warmed by the heat in the power unit room is circulated out into the vehicle cabin with almost no cooling.

Incidentally, in a case in which warm air is supplied into the vehicle cabin, as described above, the heat of the heating generating device that generates heat inside the power unit room can be dissipated to the inside of the vehicle cabin; however, in a case in which warm air is not supplied inside the vehicle cabin, it may be difficult for the heat of the heating generating device inside the power unit room to be dissipated.

In this respect, it is also conceivable to dispose a dedicated device for cooling the heat generating device inside the power unit room; however, in this case, it is conceivable that the space inside the power unit room would be eroded by the dedicated device.

SUMMARY

In consideration of the above facts, an object of the present disclosure is to provide an electric vehicle air conditioning system capable of cooling a heat generating device inside a power unit room without disposing a dedicated cooling device separately inside the power unit room.

An electric vehicle air conditioning system of a first aspect includes: an outside air introduction portion that communicates an inside of a case configuring an outer shell of an air conditioning device with an outside of a vehicle; an air circulating portion that is disposed at the inside of the case, and that circulates air from an air circulating port provided at the case to an interior of a vehicle cabin, by being driven; and an air flow direction changing portion that is provided at the case, and that is moveable to direct a portion of air circulated from the air circulating portion to a heat generating device that is disposed at an inside of a power unit room.

According to the electric vehicle air conditioning system of the first aspect, the outside air introduction portion communicates the inside of the case configuring the outer shell of an air conditioning device with an outside of the vehicle. Further, the air circulating portion is disposed at the inside of the case, and circulates air from the air circulating port provided at the case to the interior of the vehicle cabin, by being driven.

Incidentally, in order to dissipate heat from the heat generating device inside the power unit room, it is also conceivable to dispose a dedicated device for cooling the heat generating device inside the power unit room; however, in this case, it is conceivable that the space inside the power unit room would be eroded by the dedicated device.

Note that in the present disclosure, the air flow direction changing portion is provided at the case of the air conditioning device, and a portion of air circulated from the air circulating portion can be directed to the heat generating device that is disposed at the inside of the power unit room by the air flow direction changing portion.

Accordingly, in the present disclosure, a portion of air circulated from the air circulating portion can remove heat from the heat generating device that is disposed inside the power unit room.

An electric vehicle air conditioning system of a second aspect is the electric vehicle air conditioning system of the first aspect, wherein: the air flow direction changing portion includes an opening and closing door that is provided at the case, that is moveable to open and close an opening, which communicates the inside of the case with the inside of the power unit room, and that is moveable to direct air flow toward the opening in a case in which the opening is open.

According to the electric vehicle air conditioning system of the second aspect, the air flow direction changing portion includes the opening and closing door, and the opening and closing door is moveable to open and close the opening that is provided at the case of the air conditioning device. Moreover, in a case in which the opening is open, the inside of the case and the inside of the power unit room are brought into communication with each other, and part of the air flow from the air circulating portion is directed toward the opening.

An electric vehicle air conditioning system of a third aspect is the electric vehicle air conditioning system of the second aspect, further including: a heat exchanger that is disposed between the air circulating portion and the opening and closing door at the inside of the case, and that is configured to cool or heat the air.

According to the electric vehicle air conditioning system of the third aspect, the heat exchanger is disposed between the air circulating portion and the opening and closing door at the inside of the case of the air conditioning device, and the air circulated from the air circulating portion is cooled or heated by the heat exchanger. Accordingly, in the present disclosure, cold air or warm air can be supplied to the inside of the power unit room.

An electric vehicle air conditioning system of a fourth aspect is the electric vehicle air conditioning system of any one of the first aspect to the third aspect, wherein: the air circulating portion is a turbo fan that is disposed with a vehicle front-rear direction as an axial direction.

According to the electric vehicle air conditioning system of the fourth aspect, outside air that is introduced from the outside air introduction portion can be pumped to the heat exchanger side by a turbo fan disposed with the vehicle front-rear direction as the axial direction. This enables the air conditioning device to be reduced in size in the vehicle front-rear direction in comparison to a configuration adopting a sirocco fan as the air circulating portion.

An electric vehicle air conditioning system of a fifth aspect is the electric vehicle air conditioning system of the third aspect or the fourth aspect, wherein: in a state in which the air is heated by the heat exchanger, the air flow direction changing portion is moveable to direct a portion of the air to a hot water unit that heats a battery that is installed at the vehicle.

In the electric vehicle air conditioning system of the fifth aspect, a hot water unit is installed at the vehicle, and the hot water unit is capable of heating a battery that is installed at the vehicle. Accordingly, in the present disclosure, the battery can be heated by the hot water unit in a case in which the outside air temperature is low, for example, so as to suppress deterioration of the functionality of the battery.

Incidentally, since the water in the hot water unit is not warmed up at the time of startup or the like of the hot water unit, it is preferable to heat the water in the hot water unit quickly in order to suppress deterioration of the functionality of the battery.

Note that in the present disclosure, in a state in which the air circulated from the air circulating portion is heated by the heat exchanger, a portion of this air can be directed to the hot water unit, enabling the water in the hot water unit to be warmed quickly.

As described above, the electric vehicle air conditioning system according to the first aspect has an excellent advantageous effect of enabling the heat generating device inside the power unit room to be cooled without separately disposing a dedicated cooling device inside the power unit room.

The electric vehicle air conditioning system according to the second aspect has an excellent advantageous effect of enabling the accuracy with which a portion of the air circulated from the air circulating portion is circulated into the power unit room to be improved.

The electric vehicle air conditioning system according to the third aspect has an excellent advantageous effect of enabling cooling and heating of equipment inside the power unit room by air conditioning air.

The electric vehicle air conditioning system according to the fourth aspect has an excellent advantageous effect of enabling the space required for installation of an air conditioning device to be reduced.

The electric vehicle air conditioning system according to the fifth aspect has an excellent advantageous effect of enabling the temperature of a battery installed in a vehicle to be quickly increased, for example in a case in which the outside air temperature is low.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
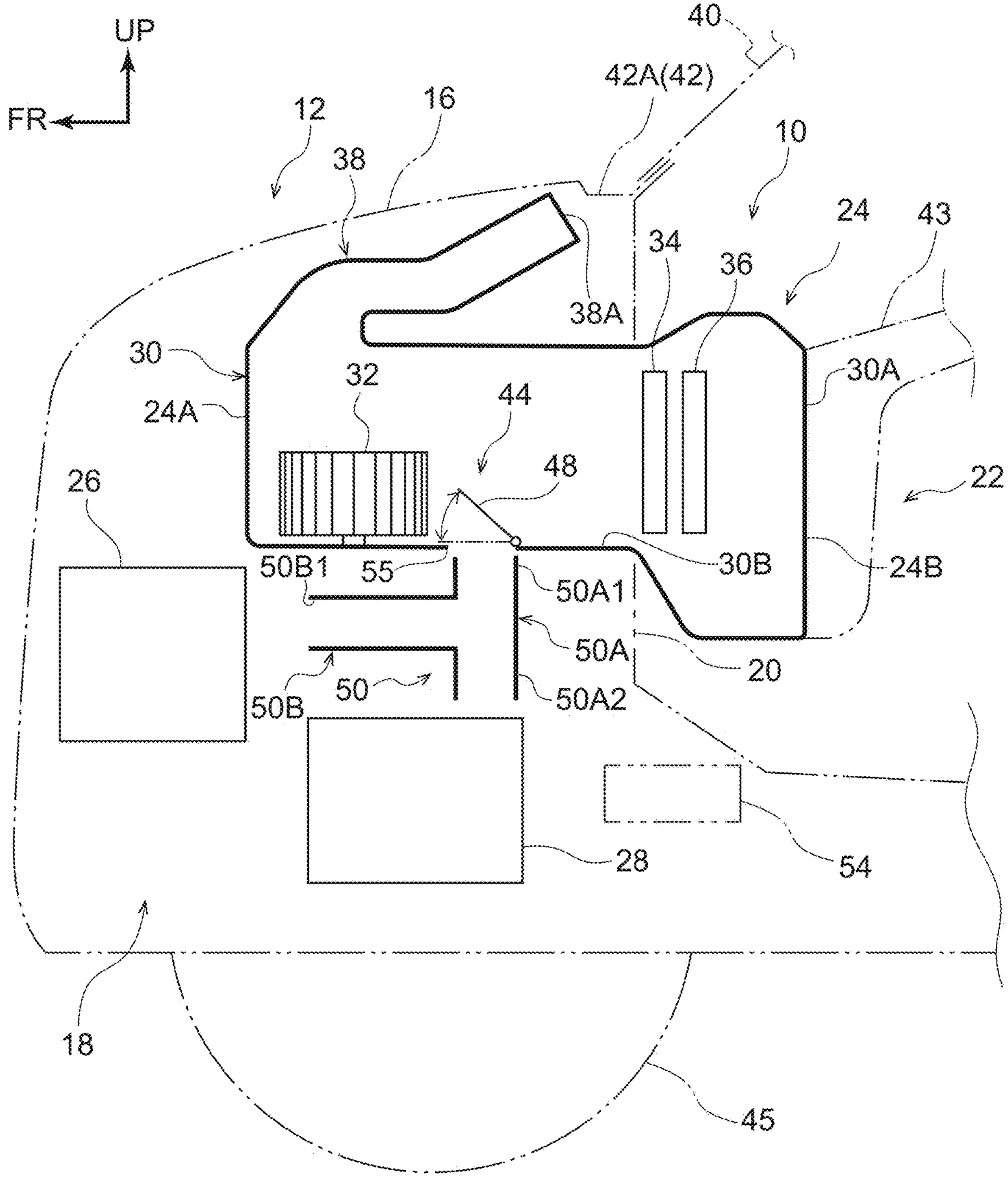
FIG. 1 is a cross-sectional diagram illustrating a configuration of a vehicle front part of a vehicle, viewed from a vehicle width direction, which is installed with an electric vehicle air conditioning system according to a first exemplary embodiment.
Figure 2:
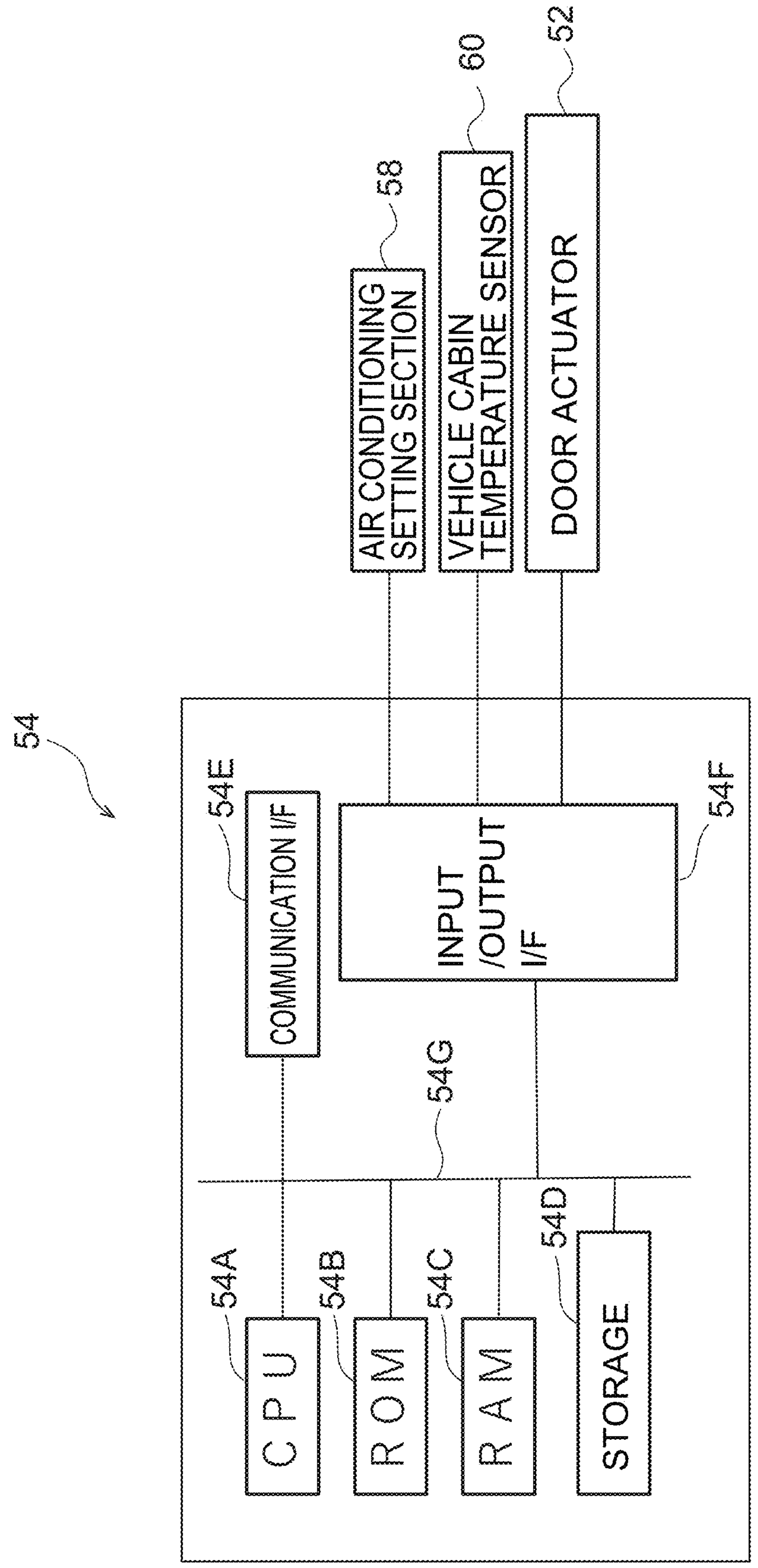
FIG. 2 is a block diagram illustrating hardware of an electric vehicle air conditioning system according to a first exemplary embodiment, and relationships between hardware of an electric vehicle air conditioning system according to a first exemplary embodiment and peripheral devices thereof.
Figure 3:
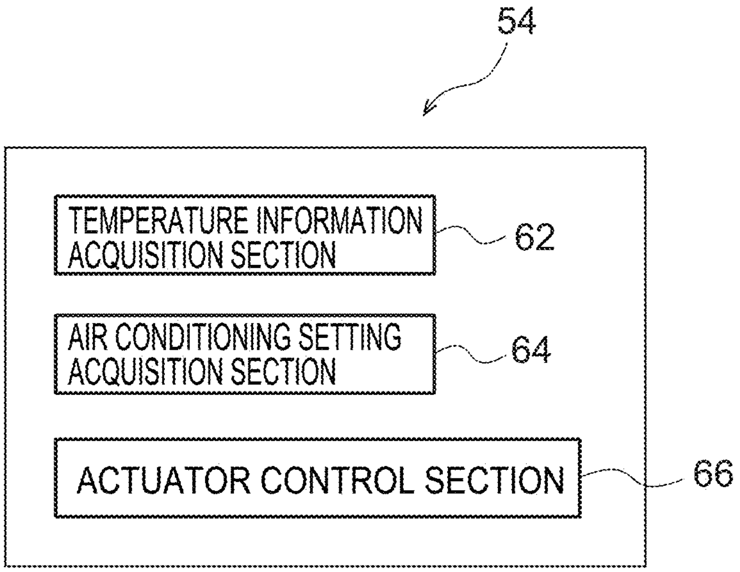
FIG. 3 is a block diagram illustrating a functional configuration of an air conditioning control device which configures part of an electric vehicle air conditioning system according to a first exemplary embodiment.

Explanation follows regarding a first exemplary embodiment of an electric vehicle air conditioning system according to the present disclosure, with reference to FIG. 1 to FIG. 3. Note that the arrow FR illustrated as appropriate in the drawings indicates a vehicle front side of a vehicle 12, which is an electric vehicle that is installed with an electric vehicle air conditioning system 10 according to the present exemplary embodiment, and the arrow UP indicates an upper side of the vehicle 12.

First, explanation follows regarding a schematic configuration of a vehicle body 14 of the vehicle 12. A power unit room 18 is provided at a front portion 16 configuring a vehicle front side part of the vehicle body 14. A dash panel 20 configuring a vehicle rear side part of the front portion 16 separates the power unit room 18 from a vehicle cabin 22.

A portion of a heating ventilation and air conditioning (HVAC) unit 24, a refrigeration cycle unit 26, and a power unit 28 serving as a heat generating device are disposed within the power unit room 18 as air conditioning devices configuring part of the electric vehicle air conditioning system 10.

More specifically, the outer shell of the HVAC unit 24 is configured by a case 30, and a vehicle front side portion is an air circulating unit 24A that houses a sirocco fan 32 serving as an air circulating portion. A vehicle rear side portion is an air conditioner unit 24B that houses an evaporator 34 serving as a heat exchanger and a heater core 36 serving as a heat exchanger.

Note that the HVAC unit 24 is attached to the dash panel 20 via a non-illustrated attachment member, while a portion of the HVAC unit 24 at an air circulating unit 24A side is disposed inside the power unit room 18, and a portion of the HVAC unit 24 at an air conditioner unit 24B side is disposed inside the vehicle cabin 22.

In the air circulating unit 24A, the sirocco fan 32 is disposed at a vehicle front side portion in the case 30, with a vehicle vertical direction serving as an axial direction of the sirocco fan 32. The sirocco fan 32 is driven by a drive portion, such as a non-illustrated motor, so as to be able to circulate outside air introduced from an outside air introduction duct 38, serving as an outside air introduction portion provided at the case 30, to the air conditioner unit 24B side.

Note that the outside air introduction duct 38 is cylindrical in shape and extends upward toward the vehicle rear side from a vehicle front side portion of the case 30. An opening 38A provided at an upper end portion of the outside air introduction duct 38 is open toward an outside air introduction port 42A serving as the outside air introduction portion provided at a cowl louver 42 disposed along a lower end portion of the windshield glass 40 of the vehicle 12.

On the other hand, in the air conditioner unit 24B, the evaporator 34 is disposed at the air circulating unit 24A side of the air conditioner unit 24B, and is connected via non-illustrated piping to a non-illustrated condenser serving as a heat generating device configuring part of the refrigeration cycle unit 26. In the cooling mode of the HVAC unit 24, a refrigerant (air conditioner gas) is circulated via a pipe between the evaporator 34 and the condenser.

More specifically, the refrigerant discharged from the evaporator 34 is compressed by a non-illustrated compressor, and flows into the condenser in a gaseous state at high temperature and high pressure. The refrigerant is cooled and liquefied by circulating air toward the condenser from a non-illustrated opening or the like provided at a vehicle front side portion of the front portion 16.

On the other hand, the refrigerant liquefied by the condenser is vaporized at the evaporator 34 by a non-illustrated expansion valve so as to flow in a low temperature, low pressure atomized state, and the heat of the gas around the evaporator 34 is removed.

Moreover, the air circulated from the air circulating unit 24A is cooled by the evaporator 34, and is circulated from an air circulating duct 43 that is connected to an air circulating port 30A provided at a vehicle rear side portion of the case 30 so as to supply cold air into the vehicle cabin 22.

The heater core 36 is disposed at the vehicle cabin 22 side with respect to the evaporator 34, and is connected via non-illustrated piping to a non-illustrated hot water heater that is capable of heating water inside a container using a positive temperature coefficient (PTC) heating element or the like. In the heating mode of the HVAC unit 24, water, which is a heat medium, is circulated via piping between the heater core 36 and the heater core 36.

More specifically, the water discharged from the heater core 36 flows into the hot water heater, and is heated by the hot water heater so as to flow into the heater core 36. The air circulated from the air circulating unit 24A is heated by the heater core 36 and circulated out from the air circulating duct 43 so as to supply warm air into the vehicle cabin 22.

The power unit 28 includes a non-illustrated motor and a non-illustrated motor electronic control unit (ECU), which controls the motor, and the power unit 28 applies driving force to drive wheels 45 during travel of the vehicle 12.

Note that the present exemplary embodiment is characterized in that the electric vehicle air conditioning system 10 includes an air flow direction changing portion 44, and the air flow direction changing portion 44 is capable of changing an air flow direction of a portion of the air circulated from the sirocco fan 32. Detailed explanation follows regarding the configuration of the air flow direction changing portion 44.

As also illustrated in FIG. 2, the air flow direction changing portion 44 includes a flap door 48 as an opening and closing door, an air circulating duct 50, and a door actuator 52. The flap door 48 is plate-shaped, and is capable of opening and closing an opening 55 that is provided at a lower wall portion 30B configuring a vehicle lower side portion of the case 30.

More specifically, the opening 55 is provided between the sirocco fan 32 and the evaporator 34 in the vehicle front-rear direction, and the flap door 48 is supported so as to be rotatable around the vehicle width direction of the lower wall portion 30B at a vehicle rear side of the opening 55. The flap door 48 is rotated by being driven by a door actuator 52. Note that in the fully opened state of the flap door 48, the flap door 48 covers a portion of the opening 55 when viewed from the vehicle vertical direction, and the flap door 48 overlaps a portion of the sirocco fan 32 when viewed from the vehicle front-rear direction. The air circulating duct 50 is connected to the opening 55.

The air circulating duct 50 includes a main duct 50A and a branch duct 50B. The main duct 50A is cylindrical in shape and extends in the vehicle vertical direction, with an opening 50A1 of the main duct 50A, which is provided at an upper end portion of the main duct 50A, connected to the opening 55, and an opening 50A2 provided at a lower end portion of the main duct 50A opening toward the power unit 28.

The branch duct 50B branches from the main duct 50A and extends toward the vehicle front side. An opening 50B1 provided at an end of the branch duct 50B opens toward a condenser of the refrigeration cycle unit 26.

The door actuator 52 includes a non-illustrated motor having an output shaft connected to the flap door 48, and a non-illustrated motor driver that controls the motor. The motor driver is installed at the vehicle 12 and controls driving of the motor based on a control signal transmitted from an air conditioner ECU 54 configuring part of the electric vehicle air conditioning system 10.

As illustrated in FIG. 2, the air conditioner ECU 54 includes a central processing unit (CPU) 54A as a processor, read only memory (ROM) 54B, random access memory (RAM) 54C, storage 54D, a communication interface (I/F) 54E, and an input/output I/F 54F. The CPU 54A, the ROM 54B, the RAM 54C, the storage 54D, the communication I/F 54E, and the input/output I/F 54F are communicably connected to each other via a bus 54G.

The CPU 54A is a central processing unit that is capable of executing various programs. More specifically, the CPU 54A reads a program from the ROM 54B, and is capable of executing the program using the RAM 54C as a workspace. The execution program stored in the ROM 54B is read and executed by the CPU 54A, enabling the air conditioner ECU 54 to perform various functions, as described below.

More specifically, the ROM 54B stores various programs and various data. The RAM 54C serves as a workspace to temporarily store programs and data.

The storage 54D includes a hard disk drive (HDD) or a solid state drive (SSD), and stores various programs including an operating system, as well as various data.

The communication I/F 54E is an interface for communicating with various control devices, such as a non-illustrated main ECU, installed at the vehicle 12, and for example, a communication protocol based on a controller area network (CAN) protocol is used.

The input/output I/F 54F is an interface for the air conditioner ECU 54 to communicate with the respective devices installed at the vehicle 12. Further, the air conditioner ECU 54 is communicably connected to various devices, which are described below, via the input/output I/F 54F. Note that these devices may be directly connected to the bus 54G.

Examples of devices connected to the air conditioner ECU 54 include the door actuator 52 described above, an air conditioning setting section 58, and a vehicle cabin temperature sensor 60. Note that these devices function as part of the electric vehicle air conditioning system 10.

The air conditioning setting section 58 transmits an operation signal based on an operation by an occupant of the vehicle 12 to the air conditioner ECU 54 so as to be able to switch between the cooling mode, the heating mode, and an air circulating mode of the HVAC unit 24, and to set the air conditioning temperature. Note that a dial switch, a touch panel, or the like can be adopted as the air conditioning setting section 58.

The vehicle cabin temperature sensor 60 is capable of measuring a temperature inside the vehicle cabin 22, and transmits a temperature signal based on this temperature to the air conditioner ECU 54. Note that the temperature information of inside the vehicle cabin 22 is temporarily stored in the storage 54D.

Next, explanation follows regarding a functional configuration of the air conditioner ECU 54, with reference to FIG. 3. The air conditioner ECU 54 functions as an aggregate of a temperature information acquisition section 62, an air conditioning setting acquisition section 64, and an actuator control section 66 by the CPU 54A reading and executing an execution program stored in the ROM 54B.

The temperature information acquisition section 62 is configured to acquire temperature information of inside the vehicle cabin 22 based on the temperature signal input from the vehicle cabin temperature sensor 60.

The air conditioning setting acquisition section 64 is configured to determine, based on the operation signal input from the air conditioning setting section 58, whether or not the HVAC unit 24 is operating, and also determine whether or not the HVAC unit 24 is in any of the cooling mode, the heating mode, or the air circulating mode in an operating state of the HVAC unit 24, and store this as air conditioning mode information.

The actuator control section 66 is configured to control the door actuator 52 based on the temperature information of inside the vehicle cabin 22 acquired by the temperature information acquisition section 62 and the air conditioning mode information acquired by the air conditioning setting acquisition section 64.

More specifically, as illustrated in FIG. 1, when the HVAC unit 24 is in the air circulating mode, the actuator control section 66 controls the door actuator 52 so as to maintain the open state in which the opening 55 is open.

Moreover, when the HVAC unit 24 is in the cooling mode, the actuator control section 66 controls the door actuator 52 so as to maintain a closed state in which the opening 55 is closed by the flap door 48 until the temperature inside the vehicle cabin 22 reaches a predetermined temperature (for example, 28° C.). Further, when the temperature inside the vehicle cabin 22 drops below a predetermined temperature, the actuator control section 66 causes the door actuator 52 to drive the flap door 48 to an open state, and also maintains this state.

Moreover, when the HVAC unit 24 is in the heating mode, the actuator control section 66 controls the door actuator 52 so as to maintain the closed state until the temperature inside the vehicle cabin 22 reaches a predetermined temperature (for example, 18° C.). When the temperature inside the vehicle cabin 22 rises above a predetermined temperature, the actuator control section 66 causes the door actuator 52 to drive the flap door 48 to the open state, and also maintains this state.

Note that the actuator control section 66 is configured to maintain the closed state in a state in which the HVAC unit 24 is not operating.

Operation and Effects of the Present Exemplary Embodiment

Next, explanation follows regarding operation and effects of the present exemplary embodiment.

In the present exemplary embodiment, as illustrated in FIG. 1, the inside of the case configuring the outer shell of the HVAC unit 24 and the outside of the vehicle 12 are brought into communication with each other by the outside air introduction port 42A and the outside air introduction duct 38. The sirocco fan 32 is disposed inside the case 30, and the sirocco fan 32 is driven so as to circulate air from the air circulating port 30A provided at the case 30 to the inside of the vehicle cabin 22.

Incidentally, in order to dissipate heat from the heat generating device inside the power unit room 18, it is also conceivable to dispose a dedicated device, inside the power unit room 18, for cooling the heat generating device; however, in this case, it is conceivable that the space inside the power unit room 18 would eroded by the dedicated device.

Note that in the present exemplary embodiment, the air flow direction changing portion 44 is provided in the case 30, and the air flow direction changing portion 44 enables a portion of the air circulated from the sirocco fan 32 to be directed to the condenser of the refrigeration cycle unit 26 or the power unit 28 which are disposed inside the power unit room 18.

Due thereto, in the present exemplary embodiment, a portion of the air circulated from the sirocco fan 32 can remove heat from the condenser of the refrigeration cycle unit 26 and the power unit 28 which are disposed inside the power unit room 18. Accordingly, in the present exemplary embodiment, it is possible to cool the condenser of the refrigeration cycle unit 26 and the power unit 28, which are inside the power unit room 18, without disposing a separate dedicated device for cooling inside the power unit room 18.

Moreover, in the present exemplary embodiment, the air flow direction changing portion 44 includes the flap door 48, and the flap door 48 is capable of opening and closing the opening 55 provided at the case 30. Moreover, when the opening 55 is open, the inside of the case 30 and the inside of the power unit room 18 are brought into communication with each other, and the air circulated from the sirocco fan 32 hits the flap door 48, thereby changing an air flow direction of a portion of the air circulated from the sirocco fan 32 toward the opening 55.

This enables the accuracy with which a portion of the air circulated from the sirocco fan 32 is circulated into the power unit room 18 to be improved in the present exemplary embodiment.

Second Exemplary Embodiment

Figure 4:
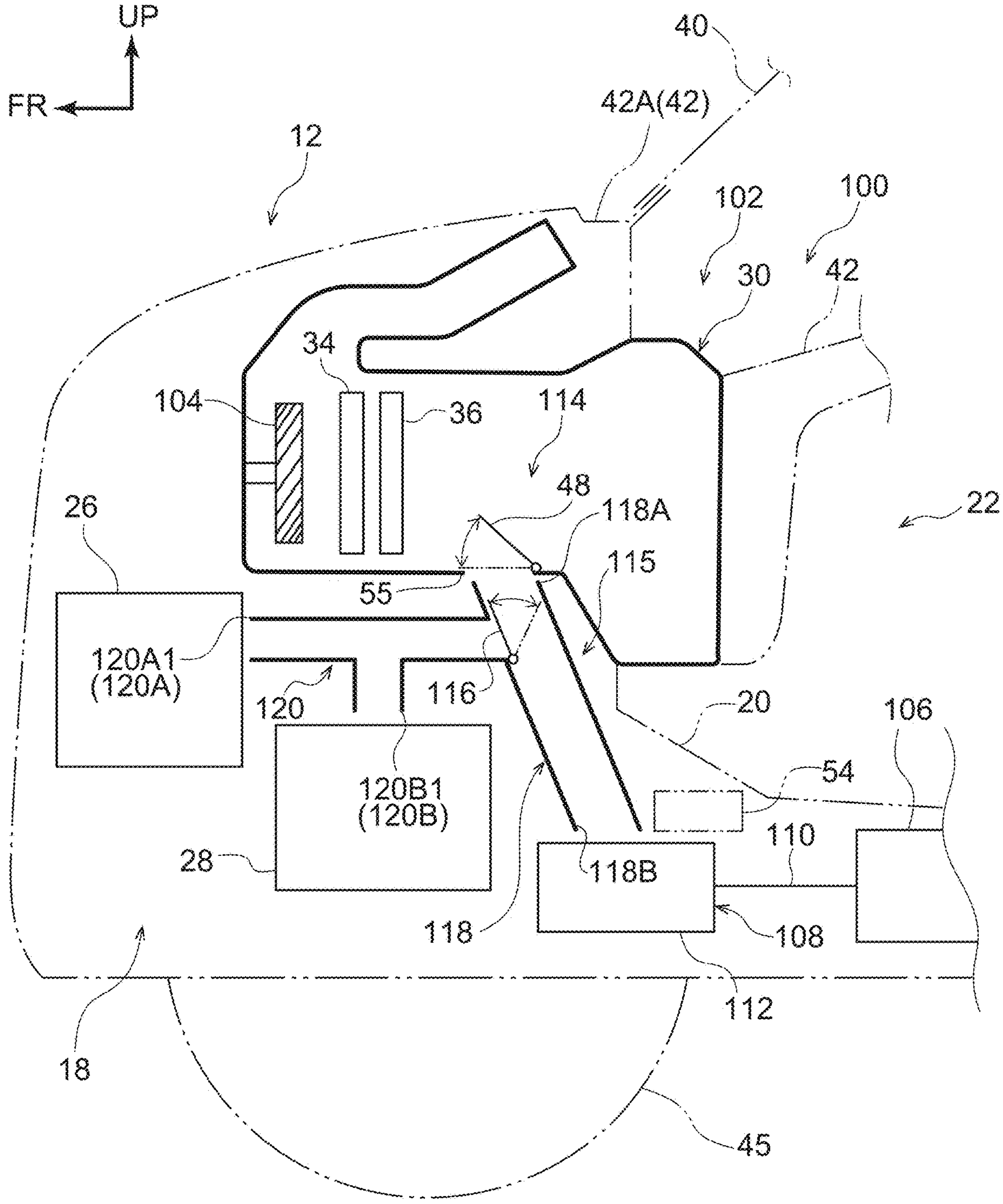
FIG. 4 is a cross-sectional diagram illustrating a configuration of a vehicle front part of a vehicle, viewed from a vehicle width direction, which is installed with an electric vehicle air conditioning system according to a second exemplary embodiment.

Next, explanation follows regarding an electric vehicle air conditioning system 100 according to a second exemplary embodiment of the present disclosure, mainly referring to FIG. 4. Note that constituent elements that are common to those of the first exemplary embodiment are allocated the same reference numerals and explanation thereof is omitted as appropriate.

The first feature of the present exemplary embodiment is that an HVAC unit 102 serving as an air conditioning device includes a turbo fan 104 serving as the air circulating portion instead of the sirocco fan 32. A second feature is that the air conditioning air can be used to heat a battery pack 106 serving as a battery installed at the vehicle 12.

More specifically, the turbo fan 104 is disposed at a vehicle front side portion in the case 30, with the vehicle front-rear direction serving as an axial direction of the turbo fan 104. The turbo fan 104 is driven by a drive portion, such as a non-illustrated motor, so as to be able to circulate outside air introduced from the outside air introduction duct 38 toward the vehicle rear side.

Moreover, in the present exemplary embodiment, the evaporator 34 and the heater core 36 are disposed, in this order, at a vehicle rear side of the turbo fan 104, and the flap door 48 and the opening 55 are disposed at a vehicle rear side of the heater core 36.

The battery pack 106 includes a non-illustrated battery case made from aluminum, which configures an outer shell of the batter pack 106, and a battery module disposed inside the battery case. The battery pack 106 is capable of being heated by a hot water unit 108.

The hot water unit 108 includes a hot water pipe 110 arranged along the battery case, and a hot water tank 112 disposed inside the power unit room 18 and capable of supplying hot water to the hot water pipe 110. The hot water unit 108 is capable of heating the battery pack 106 by circulating water, which is heated by a non-illustrated heater provided at the hot water tank 112, by a non-illustrated pump through the hot water pipe 110.

Moreover, in the present exemplary embodiment, an air flow direction changing portion 114 includes the above-described flap door 48, an air circulating duct 115 that is connected to the opening 55, and a flap door 116 provided at the air circulating duct 115. The air flow direction changing portion 114 enables the warm air and the cold air from the HVAC unit 102 to be supplied into the power unit room 18.

More specifically, the air circulating duct 115 includes a warm air duct 118 and a cold air duct 120. The warm air duct 118 is cylindrical in shape and extends downward toward the vehicle rear side from the opening 55, with a portion at the side of an opening 118A provided at an upper end portion of the warm air duct 118 connected to the opening 55 and an opening 118B provided at a lower end portion of the warm air duct 118 opening toward the hot water tank 112.

The cold air duct 120 includes a main duct 120A and a branch duct 120B. The main duct 120A is cylindrical in shape and extends toward the vehicle front side from the warm air duct 118, and an opening 120A1 provided at an end portion at a vehicle front side of the main duct 120A opens toward the condenser of the refrigeration cycle unit 26.

A branch duct 120B branches from the main duct 120A and extends toward a vehicle lower side, and an opening 120B1 provided at an end portion of the branch duct 120B opens toward the power unit 28.

The flap door 116 is basically configured in a similar manner to the flap door 48, and is supported so as to be rotatable around the vehicle width direction at the boundary between the warm air duct 118 and the cold air duct 120. The flap door 116 is rotated by being driven by a non-illustrated door actuator that is configured in a similar manner to the door actuator 52. The flap door 116 is rotated so as to enable the air circulating duct 115 to assume a first communication state in which the opening 55 and the opening 118B are in communication with each other and the warm air duct 118 and the cold air duct 120 are disconnected from each other, and a second communication state in which the opening 55, the opening 120A1, and the opening 120B1 are in communication with each other, and the warm air duct 118 is disconnected at an opening 118A side and an opening 118B side.

In the present exemplary embodiment configured as described above, when the HVAC unit 102 is in the air circulating mode, the actuator control section 66 controls the door actuator 52 so as to maintain the open state, and also controls the door actuator of the flap door 116 so as to maintain the second communication state.

Moreover, when the HVAC unit 102 is in the cooling mode, the actuator control section 66 controls the door actuator 52 so as to maintain a closed state in which the opening 55 is closed by the flap door 48 until the temperature inside the vehicle cabin 22 reaches a predetermined temperature. Further, when the temperature inside the vehicle cabin 22 drops below a predetermined temperature, the actuator control section 66 causes the door actuator 52 to drive the flap door 48 to the open state, and also causes a corresponding door actuator to drive the flap door 116 to the second communication state, and to maintain this state.

Moreover, when the HVAC unit 102 is in the heating mode, the actuator control section 66 controls the door actuator 52 so as to maintain the closed state until the temperature inside the vehicle cabin 22 reaches a predetermined temperature. Further, when the temperature inside the vehicle cabin 22 rises above a predetermined temperature, the actuator control section 66 causes the door actuator 52 to drive the flap door 48 to the open state, and also causes a corresponding door actuator to drive the flap door 116 to the first communication state, and to maintain this state.

In the present exemplary embodiment configured as described above, the evaporator 34 and the heater core 36 are disposed between the turbo fan 104 and the flap door 48, and the air circulated from the turbo fan 104 is cooled by the evaporator 34 or heated by the heater core 36. Accordingly, in the present exemplary embodiment, cold air or warm air can be supplied to the inside of the power unit room 18. As a result, in the present exemplary embodiment, the air conditioning air can cool and heat the devices inside the power unit room 18.

Moreover, in the present exemplary embodiment, the outside air introduced from the outside air introduction port 42A and the outside air introduction duct 38 can be pumped to the evaporator 34 and the heater core 36 side by the turbo fan 104 that is disposed with the vehicle front-rear direction serving as an axial direction of the turbo fan 104. This enables the size of the HVAC unit 102 in the vehicle front-rear direction to be reduced in comparison to a configuration that adopts a sirocco fan as an air circulating portion. Accordingly, in the present exemplary embodiment, the space required for installation of the HVAC unit 102 can be reduced.

In addition, in the present exemplary embodiment, the hot water unit 108 is installed at the vehicle 12, and the hot water unit 108 is capable of heating the battery pack 106 installed at the vehicle. Accordingly, in the present exemplary embodiment, the battery pack 106 is heated by the hot water unit 108 in a case in which the outside air temperature is low, and degradation of the functionality of the battery pack 106 can be suppressed.

Incidentally, since the water in the hot water unit 108 is not warmed up at the time of startup or the like of the hot water unit 108, it is preferable to heat the water in the hot water unit 108 quickly in order to suppress degradation of the functionality of the battery pack 106.

Note that in the present exemplary embodiment, in a state in which the air circulated from the turbo fan 104 is being heated by the heater core 36, a portion of this air can be directed to the hot water unit 108, enabling the water in the hot water unit 108 to be warmed quickly. Accordingly, in the present exemplary embodiment, the temperature of the battery pack 106 installed at the vehicle 12 can be quickly increased, for example, in a case in which the outside air temperature is low.

Note that in the above-described exemplary embodiments, although the direction of the air circulated from the air circulating portion is changed to the opening 55 side by the flap door 48, a configuration may be adopted in which the direction of the air circulated from the air circulating portion is changed to the opening 55 side by a fixed louver provided at a periphery of the opening 55.

Further, although the driving of the respective flap doors is controlled by the air conditioner ECU 54 in the above-described exemplary embodiments, a configuration may be adopted in which an occupant of the vehicle 12 controls the driving of the respective flap doors using an operation device or the like.

What is claimed is:

1. An electric vehicle air conditioning system, comprising:

an outside air introduction portion that communicates an inside of a case configuring an outer shell of an air conditioning device with an outside of a vehicle;

an air circulating portion that is disposed at the inside of the case, and that circulates air from an air circulating port provided at the case to an interior of a vehicle cabin, by being driven;

an air flow direction changing portion that is provided at the case, and that is moveable to direct a portion of air circulated from the air circulating portion to a heat generating device that is disposed at an inside of a power unit room; and a heat exchanger that is disposed inside of the case, and that is configured to cool or heat the air, wherein the air flow direction changing portion comprises an opening and closing door that is provided at the case, that is moveable to open and close an opening, which communicates the inside of the case with the inside of the power unit room, and that is moveable to direct air flow toward the opening when the opening is open, and wherein the opening and closing door is located between the air circulating portion and the heat exchanger.

2. The electric vehicle air conditioning system according to claim 1, wherein:

the air circulating portion is a turbo fan that is disposed with a vehicle front-rear direction as an axial direction.

3. The electric vehicle air conditioning system according to claim 2, wherein:

in a state in which the air is heated by the heat exchanger, the air flow direction changing portion is moveable to direct a portion of the air to a hot water unit that heats a battery that is installed at the vehicle.

* * * * *